Patented Mar. 25, 1924.

1,488,315

UNITED STATES PATENT OFFICE.

EVERETT BROWN CASTLEMAN, OF SPOKANE, WASHINGTON, ASSIGNOR TO HOWARD S. CLEMMER, OF SPOKANE, WASHINGTON.

CLEANSER FOR ARTIFICIAL TEETH.

No Drawing.   Application filed October 17, 1922.   Serial No. 595,169.

*To all whom it may concern:*

Be it known that I, EVERETT BROWN CASTLEMAN, a citizen of the United States, residing at Spokane, in the county of Spokane and State of Washington, have invented certain new and useful Improvements in Cleansers for Artificial Teeth, of which the following is a specification.

My present invention relates to an improved cleanser for artificial teeth in the form of an antiseptic liquid solution which may be applied to artificial teeth, dental plates, dentures, etc., and used as a detergent to be applied with a brush or cloth in usual manner.

The primary object of the invention is the provision of a sanitary cleansing solution or antiseptic detergent, which, while comparatively inexpensive in cost of production, is dependable and efficient in the performance of its required functions. The antiseptic cleansing solution embodies essentially a detergent, a preservative agent, and a coloring medium, prepared in liquid form, which may with facility be packaged or bottled for sale and conveniently adapted for use.

For the accomplishment of the foregoing and related ends, the invention then consists of the ingredients or constituents hereinafter described and particularly pointed out in the accompanying specification and claims wherein one example of the physical embodiment of my invention is set forth.

In the preparation of my liquid cleansing solution or detergent I preferably utilize tartaric acid, usually secured from the juice of grapes, berries, &c., and specifically adapted for exercising inhibitory action upon the acid-forming bacteria of the mouth, and possessing also the characteristics necessary for attacking and dissolving deposits which accumulate on the artificial teeth, dentures, &c., for cleansing and purifying the same.

The tartaric acid in the form of powder is first placed in a vessel containing water, and dissolved in the water until a saturated solution is attained.

The preservative medium, as benzoate of soda, containing a mixture of salt and metallic element, is also, and separately dissolved in water to form a saturated solution.

These two solutions, i. e. the detergent and the preservative medium, are then placed in a suitable vessel and thoroughly commingled and mixed to form a mixture of liquid consistency which possesses the necessary preservative qualities. After its preparation this mixture is then diluted by the addition of water and a coloring agent added thereto.

The coloring agent utilized may be obtained in open market in the form of tablets containing fruit or vegetable colors, and as these tablets are of known weight they may be used with convenience. An acceptable tablet for this use is known as "certified red" which is dissolved in water to form a solution that will produce the desired color. The required quantity of coloring matter thus produced may be utilized in drops for coloring the water to be added for diluting the mixture comprising the detergent and preservative medium, with the result that a lasting and acceptable color is imparted to the finished solution.

As an example of the proportions of the constituents or ingredients for the satisfactory production of the cleansing solution, I use tartaric acid solution 2 ounces, benzoate of soda solution 2 drams, coloring liquid 6 drops, water in sufficient quantity to form 4 ounces of the solution.

Larger or smaller quantities, in approximately the same proportions of ingredients used, may be prepared as herein set forth, resulting in a liquid solution which is insured against precipitation or separation of its constituents.

This antiseptic liquid solution is applied to the parts for cleansing, by use of a brush or cloth for destroying germs or bacteria, destroying all odors emanating from accumulations on the teeth or dentures, and thus purifying and restoring the parts to healthy condition.

What I claim is—

1. A cleansing solution for artificial teeth comprising tartaric acid, a saturated solution of benzoate of soda, a vegetable coloring matter, and water in sufficient quantity.

2. A liquid cleansing solution comprising tartaric acid substantially 2 ounces; a saturated solution of benzoate of soda substantially 2 drams; vegetable coloring matter substantially 6 drops, and water sufficient to make 4 ounces of the preparation.

In testimony whereof I affix my signature hereto.

EVERETT BROWN CASTLEMAN.